(12) United States Patent
Harke et al.

(10) Patent No.: US 10,707,774 B1
(45) Date of Patent: Jul. 7, 2020

(54) INVERTER CONTROLLER OF A VOLTAGE REGULATOR OF A POWER CIRCUIT

(71) Applicant: Hamilton Sundstrand Corporation, Charlotte, NC (US)

(72) Inventors: Michael C. Harke, DeForest, WI (US); Vlatko Miskovic, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/409,483

(22) Filed: May 10, 2019

(51) Int. Cl.
*H02M 7/44* (2006.01)

(52) U.S. Cl.
CPC .................... *H02M 7/44* (2013.01)

(58) Field of Classification Search
CPC ...................................... H02M 7/44
See application file for complete search history.

(56) References Cited

U.S. PATENT DOCUMENTS

| 5,450,306 A | 9/1995 | Garces et al. |
| 2005/0281067 A1* | 12/2005 | Deng ................ H02M 7/53875 363/131 |
| 2015/0002067 A1* | 1/2015 | Nondahl ................ H02P 21/00 318/503 |
| 2018/0171976 A1 | 6/2018 | Tan et al. |

* cited by examiner

*Primary Examiner* — Daniel Kessie
*Assistant Examiner* — Trinh Q Dang
(74) *Attorney, Agent, or Firm* — Locke Lord LLP; Scott D. Wofsy; Judy R. Naamat (57) ABSTRACT

A system and method is provided for controlling conversion of a received DC voltage (Vdc) into an AC inverter voltage. The method includes determining a reference Vpor (Vpor_REF) based on measured or estimated Vdc such that Vpor_REF is feasible at all values of Vdc for regulating a modulation index signal M_abc at a selectable frequency ω as a function of a measured or estimated voltage at the point of reference (Vpor), wherein M_abc is regulated by Vpor_REF to regulate the inverter hardware circuit to output the AC inverter voltage in order for Vpor to satisfy a requirement appropriate for the load.

18 Claims, 6 Drawing Sheets

INVERTER CONTROLLER OF A VOLTAGE REGULATOR OF A POWER CIRCUIT

BACKGROUND

1. Field of the Disclosure

The present disclosure relates to an inverter controller of a voltage regulator of a power circuit, and more particularly to determination of a reference signal for an inverter controller of a voltage regulator of a power circuit.

2. Description of Related Art

A voltage regulator can provide a controlled voltage from a power source. The power source is coupled to a first side of a DC link capacitor provided and the voltage regulator is coupled to an opposite side of the DC link capacitor. However, the power source may be unable to regulate a voltage across the DC link capacitor to a nominal value Vdc_NOM, such as due to load transients or source power limitations. The voltage regulator can include an inverter that converts the DC voltage received from the power source to an alternating current (AC) voltage and output the AC voltage to a load. The inverter can be configured to use a reference voltage for the point of regulation (Vpor_REF) to regulate the AC voltage output from the inverter (referred to as AC voltage Vinv) to a point of regulation in between the inverter and the load. Voltage at the point of regulation (Vpor) can be regulated to a nominal value Vpor_NOM. For example, Vpor_NOM may equal 115 Vrms at 400 Hz.

When the power source fails to regulate the DC link voltage to the nominal value Vdc_NOM, a result can be a sag in the DC voltage such that the inverter is no longer being able to regulate Vpor using Vpor_REF, such as due to saturation of a modulation index in which the modulation index exceeds a maximum value, which can cause additional undesired behavior, such as windup of the voltage regulator integrator (e.g., a synchronous reference frame or resonant controller), which can destabilize the power system, produce unwanted harmonics, and/or trip the load or voltage regulator due to over-voltage or over-current. In particular, such failure can occur due to the inverter attempting to regulate Vpor using an unfeasible reference Vpor_REF that cannot be achieved.

While conventional methods and systems have generally been considered satisfactory for their intended purpose, there is still a need in the art for a system and method that provides a feasible reference Vpor_REF to avert failure of regulation by the inverter.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an inverter of a voltage regulator of a power circuit is provided. The inverter includes an inverter hardware circuit configured to receive a DC voltage (Vdc) and convert Vdc into an AC inverter voltage that is filtered and provided to a load after passing through a point of regulation. The inverter further includes an inverter controller configured to control the inverter hardware circuit. The inverter controller includes a realizable reference generator configured to determine a reference Vpor (Vpor_REF) based on measured or estimated Vdc such that Vpor_REF is feasible at all values of Vdc for regulating a modulation index signal M_abc at a selectable frequency ω as a function of a measured or estimated voltage at the point of reference (Vpor), wherein M_abc is regulated by Vpor_REF to regulate the inverter hardware circuit to output the AC inverter voltage in order for Vpor to satisfy a requirement appropriate for the load.

In another aspect, disclosed is a method for controlling conversion of a received DC voltage (Vdc) into an AC inverter voltage. The method includes determining a reference Vpor (Vpor_REF) based on measured or estimated Vdc such that Vpor_REF is feasible at all values of Vdc for regulating a modulation index signal M_abc at a selectable frequency ω as a function of a measured or estimated voltage at the point of reference (Vpor), wherein M_abc is regulated by Vpor_REF to regulate the inverter hardware circuit to output the AC inverter voltage in order for Vpor to satisfy a requirement appropriate for the load.

In still another aspect, disclosed is an inverter controller of a voltage regulator of a power circuit. The inverter controller includes a memory storing programmable instructions and a processing device that when executing the programmable instructions is caused to perform operations. The operations include to determine a reference Vpor (Vpor_REF) based on Vdc such that Vpor_REF is feasible at all values of Vdc for regulating a modulation index signal M_abc at a selectable frequency ω as a function of a measured or estimated voltage at the point of reference (Vpor), wherein M_abc is regulated by Vpor_REF to regulate the inverter hardware circuit to output the AC inverter voltage in order for Vpor to satisfy a requirement appropriate for the load.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
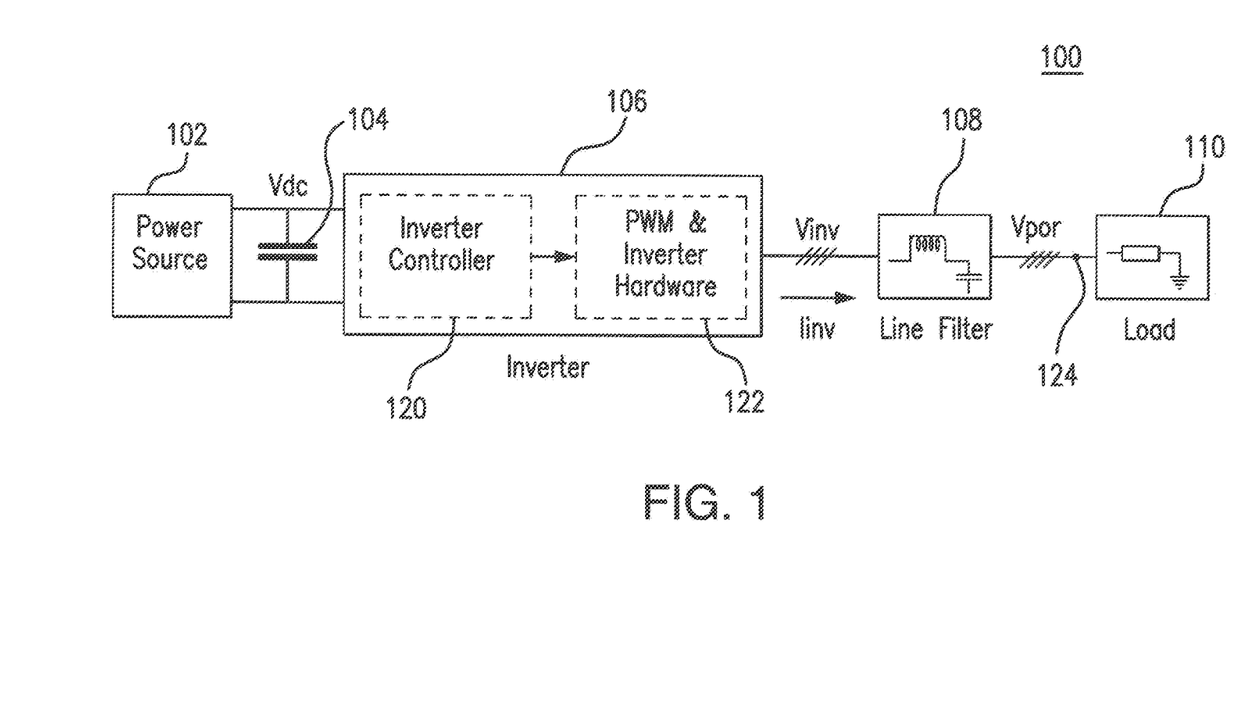
FIG. 1 is a block diagram of a power system in accordance with embodiments of the disclosure.

FIG. 1 is a block diagram showing a power system 100 that includes a power source 102, a DC link capacitor 104, an inverter 106, a line filter 108, and a load 110. The voltage across the capacitor can be measured or estimated, and is referred to as Vdc. The inverter 106 outputs an AC voltage, referred to as Vinv, and an AC current, referred to as Iinv. The line filter 108 filters Vinv, which can be measured or estimated at a node referred to as a point of regulation 124 and provided to the load 110. The voltage at the point of regulation 124 is referred to as Vpor and is regulated by the inverter 106 so that Vpor satisfies a requirement appropriate for the load 110. A Vpor regulation signal Vpor_REF if determined as a function of Vdc, wherein Vpor_REF is determined such that it is always feasible, as described in greater detail below.

The power source 102 can be a generator and rectifier connected to prime mover or a battery. The inverter 106 includes a controller 120, PWM 230 (shown in FIG. 2), and inverter hardware 122. Embodiments of the inverter 106 are shown in greater detail in FIGS. 2 and 4. The line filter 108 can include one or more inductors, capacitors, and/or resistors. The load 110 can be passive linear (with unity, leading, or lagging power factor), a constant power load or non-linear (i.e. 6- or 12-pulse rectifier) load, or any combination thereof.

Figure 2:
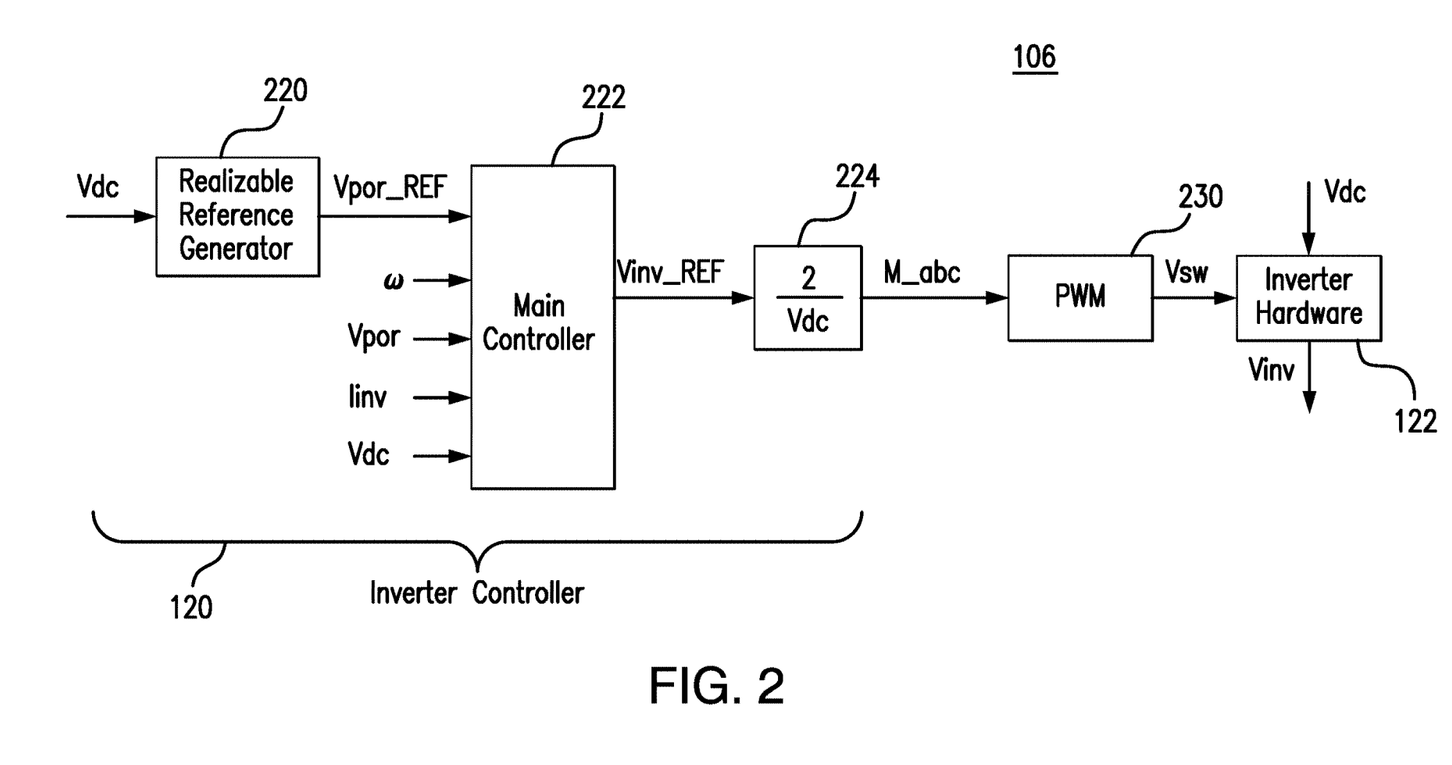
FIG. 2 shows a block diagram of an inverter of a power system in accordance with example embodiments.

FIG. 2 shows a block diagram of inverter 106 in accordance with example embodiments. The inverter hardware 122 (e.g., including gate drivers and power electronic switches) receives switching signals Vsw from pulse width modulator (PWM) 230. The PWM 230 is controlled by a single phase or multi-phase modulation index signal M_abc output by the inverter controller 120. The PWM 230 generates a pulse width modulated signal based on the control provided by M_abc and outputs the switching signals Vsw. The inverter hardware 122 includes switches that are controlled the switching signal Vsw. The switches of the inverter hardware operate on Vdc and output an AC voltage Vinv.

The inverter controller 120 includes a realizable reference generator 220, a main controller 222, and an inverse Vdc gain 224. Inverter controller 120 can be implemented in software, firmware, or hardware. For example, inverter controller 120 can be implemented using a microcontroller, microprocessor, field programmable gate array (FPGA), application specific integrated circuit (ASIC), etc. The realizable reference generator 220 receives measured or estimated Vdc and outputs a reference Vpor signal (Vpor_REF). Vpor_REF is then used by at least one other component of the inverter controller 120 to regulate Vinv, which is filtered by line filter 108 (shown in FIG. 1) to provide Vpor. More particularly, the main controller 222 receives Vpor_REF, and M_abc is a function of an inverter voltage reference signal Vinv_REF output by the main controller 222. Inverse Vdc gain 224, which operates on Vinv_REF and is a function of either Vdc (a dynamic value) or Vdc_NOM (a constant value), influences generation of M_abc. In particular, inverse Vdc gain 224 applies an inverse Vdc based feedforward gain to Vinv_REF to output M_abc. In embodiments, Vdc_NOM can be applied, instead of Vdc.

The realizable reference generator 220 receives Vdc and determines Vpor_REF as a function of Vdc. As previously disclosed, the PWM generator 230 converts the modulation references M_abc to a PWM waveform Vsw. Realizable reference generator 220 determines Vpor_REF so that Vpor_REF is always feasible for regulating M_abc at a selectable frequency ω, wherein M_abc regulates the inverter hardware 122 to output Vinv. Since Vpor is a function of Vinv, Vpor_REF influences Vpor.

Vpor needs to be regulated to that it satisfies a requirement appropriate for the load 110. For example, when Vdc achieves its nominal value Vdc_NOM, Vpor can be regulated to meet a nominal value Vpor_NOM (e.g., 115 Vrms at 400 Hz). Determination of Vdc_NOM is outside the scope of this application. In brief, Vdc_NOM can be selected, for example and without limitation, to ensure that Vpor can be attained under all normal loading conditions as well as to have provide sufficient energy storage to clear faults in the system, as well as based on other factors, such as other system parameters and/or components.

However, Vpor_NOM can be unattainable under certain conditions, such as when Vdc sags to a value that is below Vdc_NOM. In one example, when Vdc is 200V, there is no way for it to be feasible to achieve 115. Vrms AC Vpor voltage. Accordingly, in this disclosure, Vpor_REF is determined as a function of Vdc to be a feasible value at all values of Vdc, even when Vdc sags to a low voltage below a nominal Vdc voltage, such as due to load transients. When Vpor_REF is feasible, Vpor can be regulated to satisfy the requirements of load 110.

The realizable reference generator 220 determines Vpor_REF independent of the main controller 222, and therefore independent of determination of M_abc. The main controller 222 receives Vpor_REF and selectable frequency co and outputs Vinv_REF that is provided to inverse Vdc gain 224 for generating M_abc, which regulates generation of Vsw by the PWM 230 and its filtered value Vpor so that Vpor has the magnitude of Vpor_REF at frequency co. M_abc is a single phase or multi-phase modulation signal, such as a three phase modulation signal, without limitation to a particular number of phases. In embodiments, main controller 222 can receive and use other inputs for determining Vinv_REF, such as measured or estimated Vdc, measured or estimated Vpor, and/or measured or estimated inverter current (Iinv), such as for providing protection and damping, which is outside of the scope of this disclosure. The main controller 222 is not limited to a particular structure, and can be configured, for example, to in include a regulator that can be configured, for example and without limitation as synchronous reference frame, resonant, harmonic, proportional, repetitive, or model predictive. The main controller could use any of a multitude of feedback signals such as Vpor, Iinv, Vdc, Idc or Ipor which could be either measured or estimated (e.g. using observers) depending on the sensors available.

Figure 3:
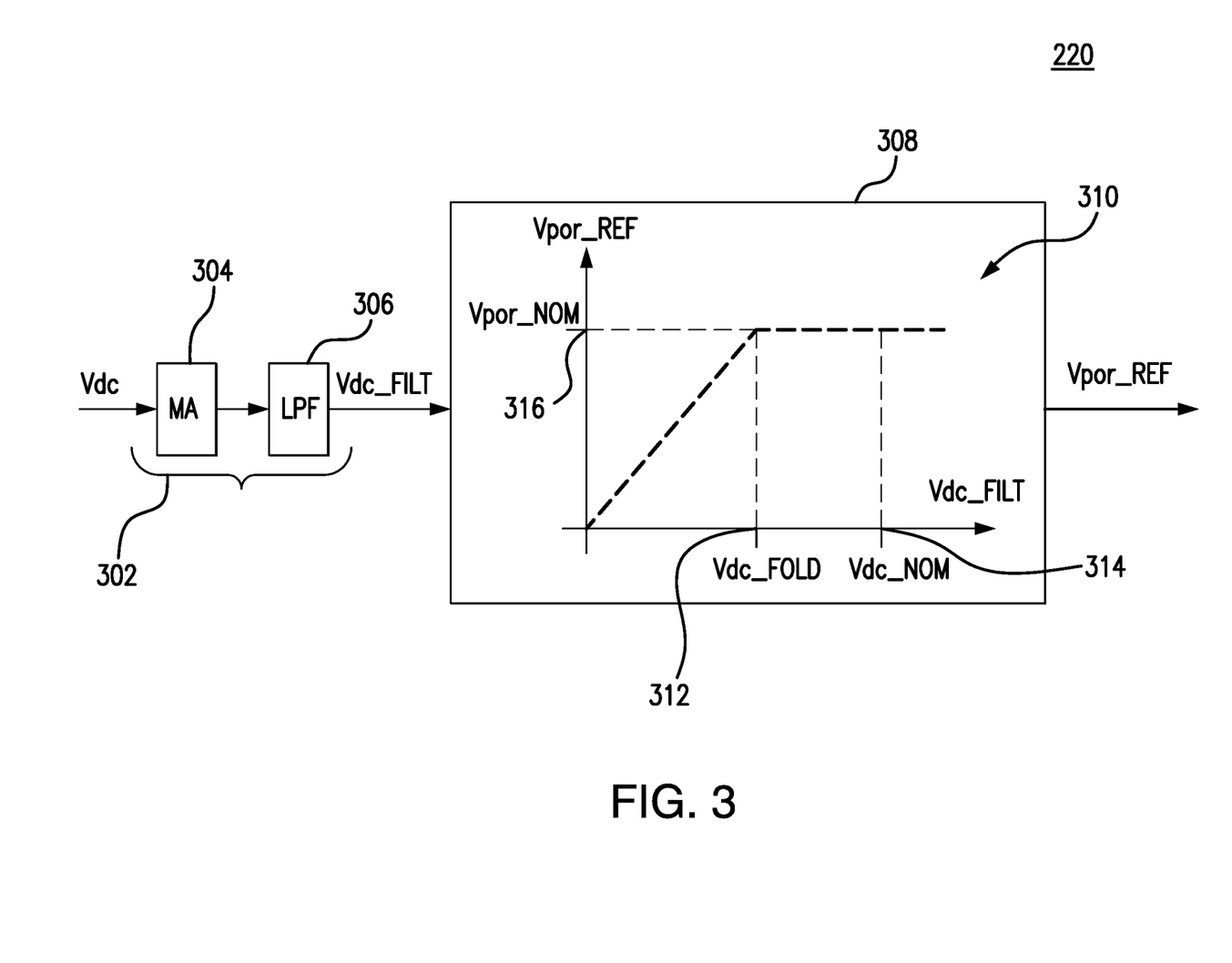
FIG. 3 is a flow diagram showing a method performed by a realization reference generator of the inverter shown in FIG. 2.

FIG. 3 shows a flow diagram of an example embodiment of realizable reference generator 220. One skilled in the art will understand that certain blocks shown can be combined, omitted, performed at the same time, or performed in a different order. The realizable reference generator 220 optionally includes a filter 302 that can include, for example a moving average filter 304 (e.g., that averages and selected number, e.g., two or four, last samples) and/or a low pass infinite impulse response filter 306, and an adjustment module 308. The filter 302, if included, receives Vdc and outputs a filtered signal Vdc_FILT. Vdc_FILT (or Vdc when filter 302 is not included) is provided to the adjustment module 308. The adjustment module 308 determines a realizable value for Vpor_REF based on Vdc (measured or estimated Vdc or Vdc_FILT (as shown in the illustrated example)).

In the example shown, the adjustment module 308 applies a predetermined lookup table (LUT) 310 that outputs realizable Vpor_REF as a function of dc (measured or estimated Vdc or Vdc_FILT (as shown in the illustrated example)). In this example implementation of LUT 310, once Vdc_FILT is above a selectable value Vdc_FOLD 312, Vpor_REF is set to Vpor_NOM 316. When Vdc_FILT drops below Vdc_FOLD 312, Vpor_REF drops proportionally. Vdc_FOLD is selected to be less than Vdc_NOM 314. In this way, even for small Vdc_FILT fluctuations, nominal reference Vpor_NOM is always realizable.

The disclosure is not limited to using LUT 310, but can use other implementations, such as to normalize Vdc, optionally filtering normalized Vdc, applying a gain function that operates on the normalized (and optionally filtered Vdc) to determine a gain value that is feasible for use with all values of Vdc. The gain value can be passed through a saturation block clamping it at a maximum value of zero (or some small positive constant close to zero), wherein the output is multiplied by Vref_NOM to determine Vpor_REF.

Figure 4:
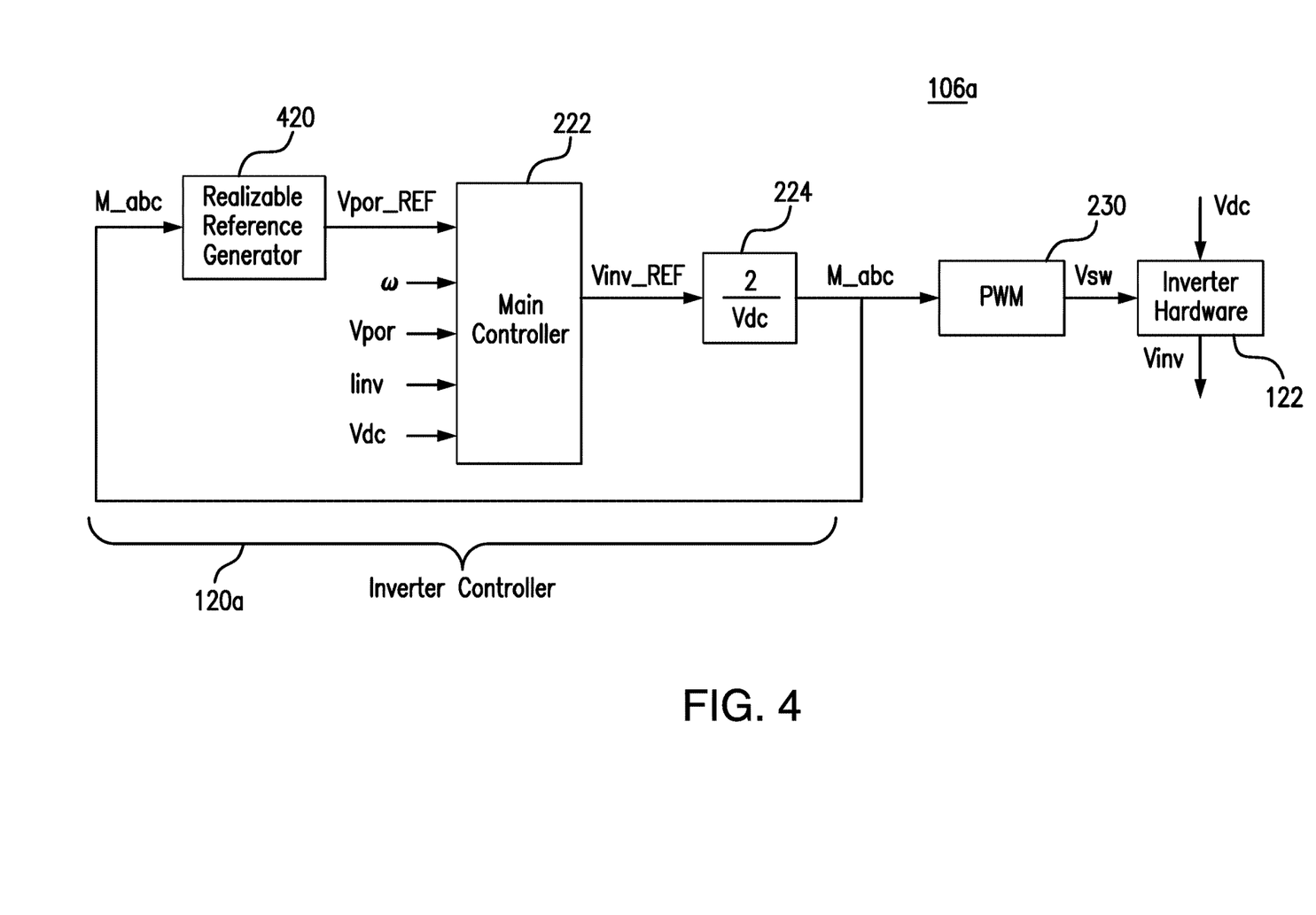
FIG. 4 is a block diagram of another embodiment of the inverter shown in FIG. 2.

FIG. 4 shows embodiments of the inverter referred to as inverter 106a. Inverter 106a includes inverter controller 120a and inverter hardware 122, wherein inverter hardware 122 is regulated by M_abc, as in inverter 106 shown in FIG. 2. Inverter controller 120a includes realizable reference generator 420 that outputs Vpor_REF and main controller 222 and inverse Vdc gain 224, wherein main controller 222 and inverse Vdc gain 224 are similar in structure and function as described with reference to FIG. 2. Inverter controller 120a can be implemented in software, firmware, or hardware. For example, inverter controller 120a can be implemented using a microcontroller, microprocessor, FPGA, ASIC, etc.

Realizable reference generator 420 is configured to receive M_abc as a feedback signal and generate Vpor_REF. As in the embodiment shown in FIGS. 2 and 3, realizable reference generator 420 generates Vpor_REF as a function of Vdc.

Figure 5:
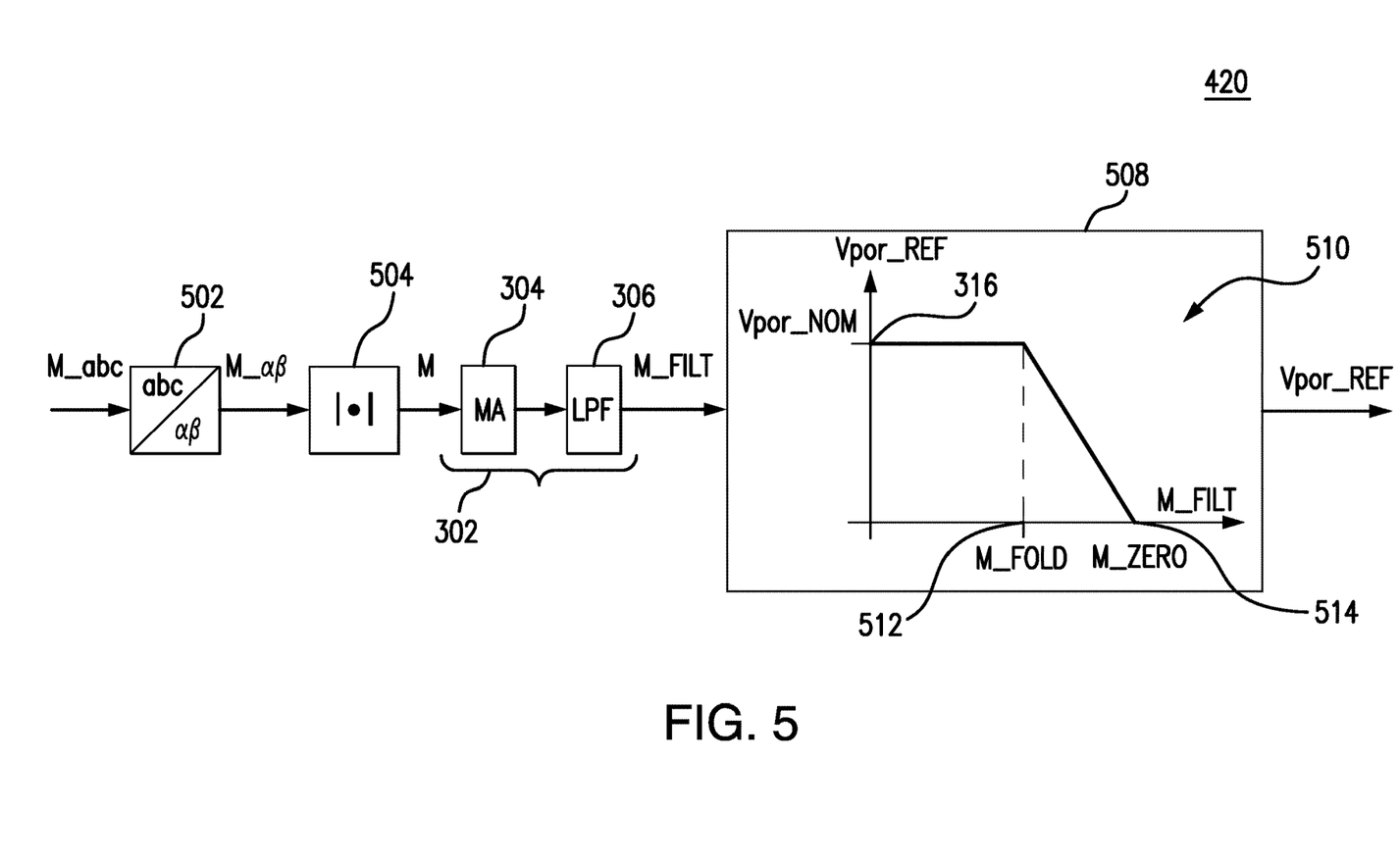
FIG. 5 is a flow diagram showing a method performed by a realization reference generator of the inverter shown in FIG. 4.

If Vdc droops, the main controller's 222 regulator will increase Vinv_REF in an attempt continue to regulate to Vpor_REF (regardless of whether inverse Vdc gain 224 uses measured Vdc or Vdc_NOM). With an infeasible reference Vpor_REF (a Vpor_REF that cannot be attained with Vdc), M_abc will saturate (M_abc reaches a modulation index of 1 where switches of the inverter hardware 122 are commanded to be on for the entire switching period). In such a scenario, realizable reference generator 420 would begin to reduce Vpor_REF when M_abc rises above a prescribed threshold 512 M_FOLD (e.g., 0.97).

FIG. 5 shows a flow diagram of an example embodiment of realizable reference generator 420. One skilled in the art will understand that certain blocks shown can be combined, omitted, performed at the same time, or performed in a different order. The realizable reference generator 420 optionally includes a transformation module 502, an absolute value module 504, a filter 302 that can include, for example a moving average filter 304 (as shown in FIG. 3), and an adjustment module 508. Transformation module 502 receives M_abc and applies a Clarke transformation that is a magnitude invariant transformation to transforms the three-phase signal M_abc into a bi-component signal M_$\alpha\beta$. The Clarke transformation can determine M_$\alpha\beta$ by applying Equations (1) and (2A) or (2B) (wherein Equations (2A) and (2B) are equivalent:

$$\text{Alpha} = (2/3)*(A - 0.5*B - 0.5*C) \quad (1)$$

$$\text{Beta} = (2/3)*(\text{sqrt}(3)/2)*(B - C) \quad (2A)$$

$$\text{Beta} = (B - C)/\text{sqrt}(3) \quad (2B)$$

The absolute value module 504 determines a single value that is the absolute value of a combination of signals M $\alpha\beta$ and outputs single signal M. The absolute value is determined by applying Equation (3):

$$M = \text{sqrt}(M\alpha * M\alpha + M\beta * M\beta), \quad (3)$$

The filter 302, if included, receives M and outputs a filtered signal M_FILT. M_FILT (or M when filter 302 is not included) is provided to the adjustment module 508. The adjustment module 508 determines a realizable value for Vpor_REF based on M (M as determined by absolute value module 504 or M_FILT determined by filter 302 (wherein M_FILT is shown in the illustrated example)).

In the example shown, the adjustment module 508 applies a predetermined lookup table (LUT) 510 that outputs realizable Vpor_REF as a function of M (M or M_FILT (as shown in the illustrated example)). In this example implementation of LUT 510, once M_FILT (or M) is below a selectable value M_FOLD 512, Vpor_REF is set to Vpor_NOM 316. When M_FILT rises above M_FOLD 512, Vpor_REF drops proportionally until Vpor_REF reaches M_ZERO, at which point Vpor_REF should be set to zero. In this way, even for small Vdc_M fluctuations, nominal reference Vpor_NOM is always realizable.

The disclosure is not limited to using LUT 510, but can use other implementations, such as to perform the transformation function according to Equations (1) and (2A) or (2B) to either a nominal M_abc (M_NOM_abc) and to apply the absolute value of Equation (3) to the output of the transformation function. In a Vdc_NOM/Vdc block, M_NOM_abc is multiplied by a gain Vdc_NOM/Vdc to estimate true modulation index M_EST. M_EST can optionally be filtered, e.g., by a moving average and/or low pass infinite impulse response filter, creating M_EST_AVE. M_EST_AVE can be processed by a gain of modulation (GM) which defines how much over-modulation is allowed. The GM can be as simple as constant greater less 1. The output of GM is processed by a saturation function that clamps the output of GM to a minimum value of one, and the inverse function is applied to an output of the saturation block, resulting in a range of zero to one. The result of the inverse function can be multiplied by Vref_NOM to provide Vpor_REF.

In embodiments, the gain modulation can simply be a constant GF. For example, if GF=0.9, when the adjustment module 508 determines that M_EST_AVE is less than 1.11 (which is the inverse of 0.9), Vpor_REF=Vref_NOM, and when the adjustment module 508 determines that M_EST_AVE is more than 1.11, Vpor_REF would be reduced accordingly.

In another example of an implementation of the adjustment module 508, the transformation function can be applied to M_abc (instead of M_NOM_abc), outputting the value M_$\alpha\beta$. The absolute value function is applied M_$\alpha\beta$ to provide value M. M is optionally filtered. M, or the output of the filter, is processed by the GM, with the GM output provided to the saturation function. The saturation function output is provided to the inverse function. The output of the inverse function is multiplied by Vref_NOM to determine Vpor_REF.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 6:
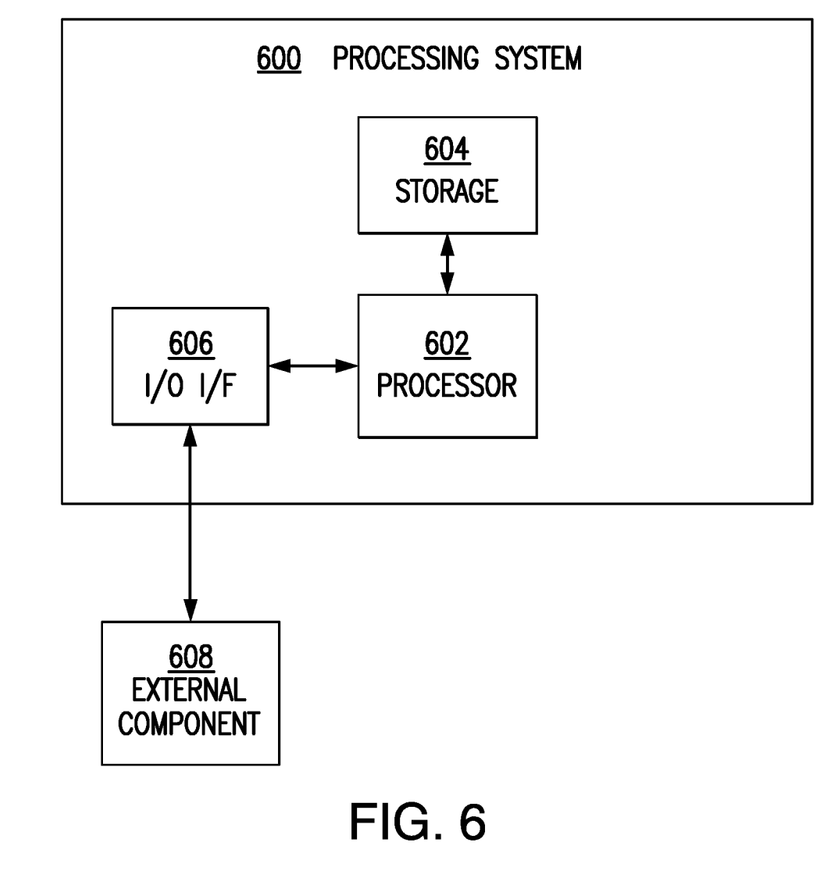
FIG. 6 is a block diagram of an exemplary computer system configured to implement components of the realization reference generators shown in FIGS. 2-5.

With reference to FIG. 6, a block diagram of an example computing system 600 is shown, which provides an example configuration of the controller 132 or one or more portions of the controller 132. Additionally, all or portions of the control circuit 110, in addition to controller 132, could be configured as software, and computing system 600 could represent such portions. Computing system 600 is only one example of a suitable system and is not intended to suggest any limitation as to the scope of use or functionality of embodiments of the disclosure described herein. Computing system 600 can be implemented using hardware, software, and/or firmware. Regardless, computing system 600 is capable of being implemented and/or performing functionality as set forth in the disclosure.

Computing system 600 is shown in the form of a general-purpose computing device. Computing system 600 includes a processing device 602, memory 604, an input/output (I/O) interface (I/F) 606 that can communicate with an internal component 610, and optionally an external component 608.

The processing device 602 can include, for example, a PLOD, microprocessor, DSP, a microcontroller, an FPGA, an ASCI, and/or other discrete or integrated logic circuitry having similar processing capabilities.

The processing device 602 and the memory 604 can be included in components provided in the FPGA, ASCI, microcontroller, or microprocessor, for example. Memory 604 can include, for example, volatile and non-volatile memory for storing data temporarily or long term, and for storing programmable instructions executable by the processing device 602. I/O I/F 606 can include an interface and/or conductors to couple to the one or more internal components 608 and/or external components 610.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the controller 132 (or other portions of control circuit 110) may be implemented or executed by one or more computer systems, such as a microprocessor. Each computer system 600 can implement controller 132, or multiple instances thereof. In various embodiments, computer system 600 may include one or more of a microprocessor, an FPGA, application specific integrated circuit (ASCI), microcontroller. The computer system 600 can be provided as an embedded device. All or portions of the computer system 600 can be provided externally, such by way of a mobile computing device, a smart phone, a desktop computer, a laptop, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Potential advantages provided by the disclosed method and system include the ability to provide a Vpor_REF that is realizable.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An inverter of a voltage regulator of a power circuit, the inverter comprising:
   an inverter hardware circuit configured to receive a DC voltage and convert the DC voltage into an AC inverter voltage that is filtered and provided to a load after passing through a point of regulation; and
   an inverter controller configured to control the inverter hardware circuit, the inverter controller including:
   a realizable reference generator configured to determine a reference voltage at a point of regulation based on the DC voltage as measured or estimated such that the reference voltage at the point of regulation is feasible at all values of the DC voltage for regulating a modulation index signal at a selectable frequency as a function of a measured or estimated voltage at the point of regulation, wherein the modulation index signal is regulated by the reference voltage at the point of regulation to regulate the inverter hardware circuit to output the AC inverter voltage in order for the voltage at the point of regulation to satisfy a requirement appropriate for the load, wherein the realizable reference generator further selects the voltage at the point of regulation so that the voltage at the point of regulation does not exceed a nominal voltage at the point of regulation, and wherein the voltage at the point of regulation is selected so that when an input value that is a function of the DC voltage is above a predetermined value, the reference voltage at the point of regulation is set to the nominal voltage at the point of regulation, and when the input value is below the predetermined value, the reference voltage at the point of regulation changes proportionally to the changes in the input value.

2. The inverter of claim 1, wherein determination of the reference voltage at the point of regulation is independent of determination of the modulation index signal.

3. An inverter of a voltage regulator of a power circuit, the inverter comprising:

an inverter hardware circuit configured to receive a DC voltage and convert the DC voltage into an AC inverter voltage that is filtered and provided to a load after passing through a point of regulation; and an inverter controller configured to control the inverter hardware circuit, the inverter controller including:

a realizable reference generator configured to determine a reference voltage at a point of regulation based on the DC voltage as measured or estimated such that the reference voltage at the point of regulation is feasible at all values of the DC voltage for regulating a modulation index signal the modulation index signal at a selectable frequency $\omega$ as a function of a measured or estimated voltage at the point of regulation, wherein the modulation index signal is regulated by the reference voltage at the point of regulation to regulate the inverter hardware circuit to output the AC inverter voltage in order for the voltage at the point of regulation to satisfy a requirement appropriate for the load, wherein the realizable reference generator is configured to receive the modulation index signal as a feedback signal and to determine the reference voltage at the point of regulation based on the modulation index signal, wherein the reference voltage at the point of regulation is selected as a function of an input value so that the reference voltage at the point of regulation does not exceed a nominal voltage at the point of regulation, and the realizable reference generator is configured to process the modulation index signal and provide the processed the modulation index signal as the input value, and wherein when the input value is below a predetermined value, the reference voltage at the point of regulation is set to the nominal-voltage at the point of regulation, and when the input value is above the predetermined value, the reference voltage at the point of regulation changes proportionally to the changes in the input value.

4. The inverter of claim 1, wherein the nominal voltage at the point of regulation is selected to be greater than the predetermined value, wherein the predetermined value is determined to be a voltage at which the reference voltage at the point of regulation needs to be reduced in order to be feasible when the input value is equal to or less than the predetermined value.

5. The inverter of claim 1, wherein the realizable reference generator further comprises a filter having at least one of a moving average filter and a low pass infinite impulse response filter that is configured to receive and filter the DC voltage and output at least one filtered signal that is provided as the input value.

6. The inverter of claim 1, wherein the realizable reference generator is configured to receive the modulation index signal as a feedback signal and to determine the reference voltage at the point of regulation based on the modulation index signal.

7. The inverter of claim 1, wherein the predetermined value is determined to be a voltage at which the reference voltage at the point of regulation needs to be reduced in order to be feasible when the input value is equal to or greater than the predetermined value.

8. The inverter of claim 1, wherein the inverter hardware includes a pulse width modulator that is configured to receive the DC voltage, to be modulated by the modulation index signal, and to output the AC inverter voltage.

9. The inverter of claim 6, wherein the reference voltage at the point of regulation is selected as a function of an input value so that the reference voltage at the point of regulation does not exceed a nominal voltage at the point of regulation, and the realizable reference generator is configured to process the modulation index signal and provide the processed modulation index signal as the input value.

10. The inverter of claim 9, wherein the modulation index signal is a three phase signal, and processing the modulation index signal includes performing a magnitude invariant transformation to transform the three phase signal into two transformed signals of a two-axis reference frame.

11. The inverter of claim 10, wherein the realizable reference generator is further configured to determine an absolute value that is a function of the two transformed signals and provide the absolute value as the input value.

12. An inverter of a voltage regulator of a power circuit, the inverter comprising:

an inverter hardware circuit configured to receive a DC voltage and convert the DC voltage into an AC inverter voltage that is filtered and provided to a load after passing through a point of regulation; and an inverter controller configured to control the inverter hardware circuit, the inverter controller including:

a realizable reference generator configured to determine a reference voltage at a point of regulation based on the DC voltage as measured or estimated such that the reference voltage at the point of regulation is feasible at all values of the DC voltage for regulating a modulation index signal the modulation index signal at a selectable frequency $\omega$ as a function of a measured or estimated voltage at the point of regulation, wherein the modulation index signal is regulated by the reference voltage at the point of regulation to regulate the inverter hardware circuit to output the AC inverter voltage in order for the voltage at the point of regulation to satisfy a requirement appropriate for the load, wherein the realizable reference generator is configured to receive the modulation index signal as a feedback signal and to determine the reference voltage at the point of regulation based on the modulation index signal, wherein the reference voltage at the point of regulation is selected as a function of an input value so that the reference voltage at the point of regulation does not exceed a nominal voltage at the point of regulation, and the realizable reference generator is configured to process the modulation index signal and provide the processed the modulation index signal as the input value, wherein the modulation index signal is a three phase signal, and processing the modulation index signal includes performing a magnitude invariant transformation to transform the three phase signal into two transformed signals of a two-axis reference frame, wherein the realizable reference generator is further configured to determine an absolute value that is a function of the two transformed signals and provide the absolute value as the input value, and wherein the realizable reference generator further comprises a filter having at least one of a moving average filter and a low pass infinite impulse response filter that is configured to receive the absolute value and output at least one filtered signal that is provided as the input value.

13. The inverter of claim 3, wherein the voltage at the point of regulation is selected so that when an input value is above a predetermined value, the reference voltage at the point of regulation is set to the nominal voltage at the point of reference, and when the input value is below the predetermined value, the reference voltage at the point of regulation changes proportionally to the changes in the input value.

14. A method for controlling conversion of a received DC voltage into an AC inverter voltage, the method comprising:
determining a reference voltage at a point of regulation based on the DC voltage as measured or estimated such that the reference voltage at the point of regulation is feasible at all values of the DC voltage for regulating a modulation index signal at a selectable frequency as a function of a measured or estimated voltage at the point of regulation, wherein the modulation index signal is regulated by the reference voltage at the point of regulation to regulate the inverter hardware circuit to output the AC inverter voltage in order for the voltage at the point of reference to satisfy a requirement appropriate for the load;
receiving the DC voltage;
setting the reference voltage at the point of regulation so that it does not exceed a nominal voltage at the point of regulation, regardless of the DC voltage;
determining an input value that is a function of the DC voltage; and
reducing the reference voltage at the point of regulation proportionately to the input value dependent on the input value relative to a predetermined value.

15. The method of claim 14, wherein determining the voltage at the point of reference is performed independent of determining the modulation index signal.

16. The method of claim 15, further comprising:
receiving the modulation index signal as a feedback signal, wherein determining the reference voltage at the point of regulation is based on the modulation index signal.

17. An inverter controller of a voltage regulator of a power circuit, the inverter controller comprising:
a memory storing programmable instructions; and
a processing device that when executing the programmable instructions is caused to:
determine a reference voltage at a point of regulation based on the DC voltage as measured or estimated such that the reference voltage at the point of regulation is feasible at all values of the DC voltage for regulating a modulation index signal at a selectable frequency as a function of a measured or estimated voltage at the point of regulation, wherein the modulation index signal is regulated by the reference voltage at the point of regulation to regulate the inverter hardware circuit to output the AC inverter voltage in order for the voltage at the point of reference to satisfy a requirement appropriate for the load;
receive the DC voltage;
set the reference voltage at the point of regulation so that it does not exceed a nominal voltage at the point of regulation, regardless of the DC voltage;
determine an input value that is a function of the DC voltage; and
reduce the reference voltage at the point of regulation proportionately to the input value dependent on the input value relative to a predetermined value.

18. The inverter of claim 17, wherein determining the reference voltage at the point of regulation is performed independent of determining the modulation index signal.

* * * * *